United States Patent
Pantke et al.

(10) Patent No.: US 8,071,670 B2
(45) Date of Patent: Dec. 6, 2011

(54) AQUEOUS DISPERSIONS OF POLYVINYLACETATE AND SILICA, PROCESSES FOR PREPARING THE SAME, USES THEREFOR AND SUBSTRATES COATED AND/OR BONDED THEREWITH

(75) Inventors: Dietrich Pantke, Ratingen (DE); Stephan Kirchmeyer, Leverkusen (DE); Rüdiger Musch, Bergisch-Gladbach (DE); Knud Panskus, Leverkusen (DE)

(73) Assignee: Akzo Nobel Chemicals International B.V. (NL)

( * ) Notice: Subject to any disclaimer, the term of this patent is extended or adjusted under 35 U.S.C. 154(b) by 135 days.

(21) Appl. No.: 11/746,919

(22) Filed: May 10, 2007

(65) Prior Publication Data
US 2007/0292683 A1    Dec. 20, 2007

(30) Foreign Application Priority Data
May 11, 2006    (DE) .......................... 10 2006 021 875

(51) Int. Cl.
| B60C 1/00 | (2006.01) |
| C08K 3/34 | (2006.01) |
| B32B 17/10 | (2006.01) |
| B05D 3/02 | (2006.01) |
| C08J 3/215 | (2006.01) |

(52) U.S. Cl. ......... 524/493; 428/339; 427/387; 523/334
(58) Field of Classification Search .................. 524/493; 523/334; 428/339; 427/387
See application file for complete search history.

(56) References Cited

U.S. PATENT DOCUMENTS

| 3,738,957 A | 6/1973 | Iler |
| 3,883,489 A | 5/1975 | Matschke et al. |
| 4,481,328 A | 11/1984 | Harréus et al. |
| 5,118,727 A | 6/1992 | Roberts et al. |
| 5,352,717 A * | 10/1994 | Bergishagen .................. 524/48 |
| 2003/0198788 A1* | 10/2003 | Andersson et al. ......... 428/195.1 |
| 2005/0131109 A1* | 6/2005 | Arndt et al. ................... 523/334 |

FOREIGN PATENT DOCUMENTS
GB    1144767    3/1969

* cited by examiner

Primary Examiner — David W Wu
Assistant Examiner — Angela C Scott
(74) Attorney, Agent, or Firm — Connolly Bove Lodge & Hutz LLP

(57) ABSTRACT

Aqueous polymeric dispersions comprising a mixture of: (a) a component selected from the group consisting of polyvinylacetates, polyvinylacetate copolymers, and combinations thereof; and (b) $SiO_2$ particles having an average particle diameter of 1 to 400 nm; their use as adhesives and coatings; processes for preparing such dispersions; and substrates coated and/or adhered therewith.

20 Claims, 3 Drawing Sheets

AQUEOUS DISPERSIONS OF POLYVINYLACETATE AND SILICA, PROCESSES FOR PREPARING THE SAME, USES THEREFOR AND SUBSTRATES COATED AND/OR BONDED THEREWITH

BACKGROUND OF THE INVENTION

Polymer dispersions for use in the adhesives and coatings sectors have been available primarily as solvent-containing formulations. For ecological reasons, however, aqueous polymer dispersions that can be processed to give corresponding aqueous coating or adhesive formulations have been introduced. Such aqueous dispersions include, for example, those based on polyvinylacetate (cf. Merkblatt TKH-3 "Dispersions-Holzleime" (wood-glue dispersions) issued 2004 by Industrieverband Klebstoffe eV, Düsseldorf (www.klebstoffe.com)).

Such known aqueous dispersions have the disadvantage that the layers have to be dried after application (open assembly time). In the case of adhesives, the expression "open assembly time" is understood, according to DIN 16920, to be the interval of time after applying the adhesive within which wet bonding is possible. This is the time after applying the adhesive up to the use of bonding pressure. The duration of bonding pressure until achieving sufficient initial, strength depends on a number of factors such as e.g. thickness applied, absorption capacity of the substrate, temperature while joining the substrates being bonded and the humidity of the air. In general the setting speed for aqueous adhesive formulations is slow and the film-formation temperature is restricted to temperatures >0° C. to >15° C., depending on the type of polymer Important characteristics of such formulations are therefore the open assembly time, the setting speed and the pot life of the dispersions, as well as the water resistance and thermal stability of the resulting dry coatings or adhesive films. The "pot life" is understood to be the time over which the formulation can be processed after incorporation of the second dispersion.

According to the prior art (Ullmann, Encyklopadie der techischen Chemie, vol. 14, 4th edition, p. 250), setting speed may be accelerated and the film-formation temperature may be lowered by adding solvents and/or plasticisers. However, the thermal stability of the coating or adhesive joint can be reduced by these additions. A higher thermal stability can be achieved by adding a second dispersion based on resorcinol or melamine resins or inorganic salts, such as, e.g. chromium nitrate. The "pot life" of these two-pack dispersion formulations, however, is restricted to a few hours.

Coatings and bonded joints with high water resistance and thermal stability can be obtained by the so-called "EPI system" (Emulsion Polymer Isocyanate). This is achieved by adding about 15% isocyanate, mostly MDI (diphenylmethane 4,4'-diisocyanate), to the polymer dispersion. However, due to the very short pot life, only mechanical application of two-pack formulations (2K-formulation) is possible.

In addition, various metal salt crosslinking agents used in such 2K-formulations are classified as corrosive or fire-promoting. In the case of isocyanate-based crosslinking agents, no matter what type of isocyanate, the irritant effect and the sensitizing potential towards skin and the respiratory tract have to be taken into account (see: Merkblatt TKH-3 "Dispersions-Holzleime" (wood-glue dispersions), issued 2004 by Industrieverband Klebstoffe eV, Dülsseldorf (www.klebstoffe.com)).

The use of silica products in various other, unrelated applications is known, for example, the use of solid $SiO_2$ products to control Theological properties, as fillers or as adsorbents. Silicon dioxide dispersions (for example silica sols), on the other hand, are used predominantly as binders for many different inorganic materials, as polishing agents for semiconductors or as flocculation partners in colloidal chemical reactions. In addition, for example, the use of polychloroprene lattices in the presence of silica sols as impregnation layers when producing flameproof elements is known. Pyrogenic silicas in combination with polychloroprene lattices for producing flame resistant foam finishes or bitumen finishes, and their use in combination with chloroprene/acrylic acid copolymers is also known.

BRIEF SUMMARY OF THE INVENTION

The present invention includes aqueous polymer dispersions comprising polyvinylacetate and/or polyvinylacetate copolymers and silicon dioxide, processes for preparing these and their use.

The present invention is thus based on the surprising discovery of aqueous polymer dispersions that set rapidly and have a high initial strength after application to the substrates being coated or bonded and the resulting dry coatings or adhesive films have a high water resistance and thermal stability.

Surprisingly, it was found by the inventors that in the case of dispersions based on polyvinylacetate or polyvinylacetate copolymers, in combination with aqueous silicon dioxide dispersions, polymer dispersions are obtained that can bond or coat substrates with shorter open assembly times, even at room temperature and in the still moist state. The resulting coatings and adhesive films exhibit surprisingly high initial strengths as well as water resistance and thermal stability in the dry state.

Thus, the present invention includes aqueous polymer dispersions, characterized in that they contain: (a) at least one dispersion containing polyvinylacetate and/or at least one polyvinylacetate copolymer and (b) at least one aqueous silicon dioxide dispersion containing $SiO_2$ particles with an average particle diameter of 1 to 400

One embodiment of the present invention includes an aqueous polymeric dispersion comprising a mixture of: (a) a component selected from the group consisting of polyvinylacetates, polyvinylacetate copolymers, and combinations thereof; and (b) $SiO_2$ particles having an average particle diameter of 1 to 400 nm.

Another embodiment of the present invention includes a process comprising: (a) providing a first aqueous dispersion comprising $SiO_2$ particles having an average particle diameter of 1 to 400 nm; and (b) admixing a component selected from the group consisting of polyvinylacetates, polyvinylacetate copolymers, and combinations thereof with the first aqueous dispersion.

Various process embodiments of the present invention can further include adding an OH group-containing oligomer or polymer to the first aqueous dispersion prior to admixing the component with the first aqueous dispersion.

Another embodiment of the present invention includes a method comprising: (a) providing a first substrate having a surface; (b) applying an aqueous polymeric dispersion to the surface, wherein the aqueous polymeric dispersion comprises a mixture of: (a) a component selected from the group consisting of polyvinylacetates, polyvinylacetate copolymers, and combinations thereof, and (b) $SiO_2$ particles having an average particle diameter of 1 to 400 nm; and (c) drying the aqueous polymeric dispersion to form a film. Various embodiments can further include disposing a second substrate on the aqueous polymeric dispersion prior to drying such that an adhesive bond between the first substrate and the second substrate is provided by the film after drying.

Additional embodiments of the present invention include substrates prepared in accordance with the various method embodiments of the present invention.

In the context of the invention, the expression "aqueous" is understood to mean that the dispersions substantially contain water, i.e. at least 30 wt. % water, with respect to the total weight of the dispersion.

BRIEF DESCRIPTION OF THE SEVERAL VIEWS OF THE DRAWING

The foregoing summary, as well as the following detailed description of the invention, will be better understood when read in conjunction with the appended drawings. For the purpose of assisting in the explanation of the invention, there are shown in the drawings representative embodiments which are considered illustrative. It should be understood, however, that the invention is not limited to the precise arrangements and instrumentalities shown.

In the drawings.

DETAILED DESCRIPTION OF THE INVENTION

Figure 1:
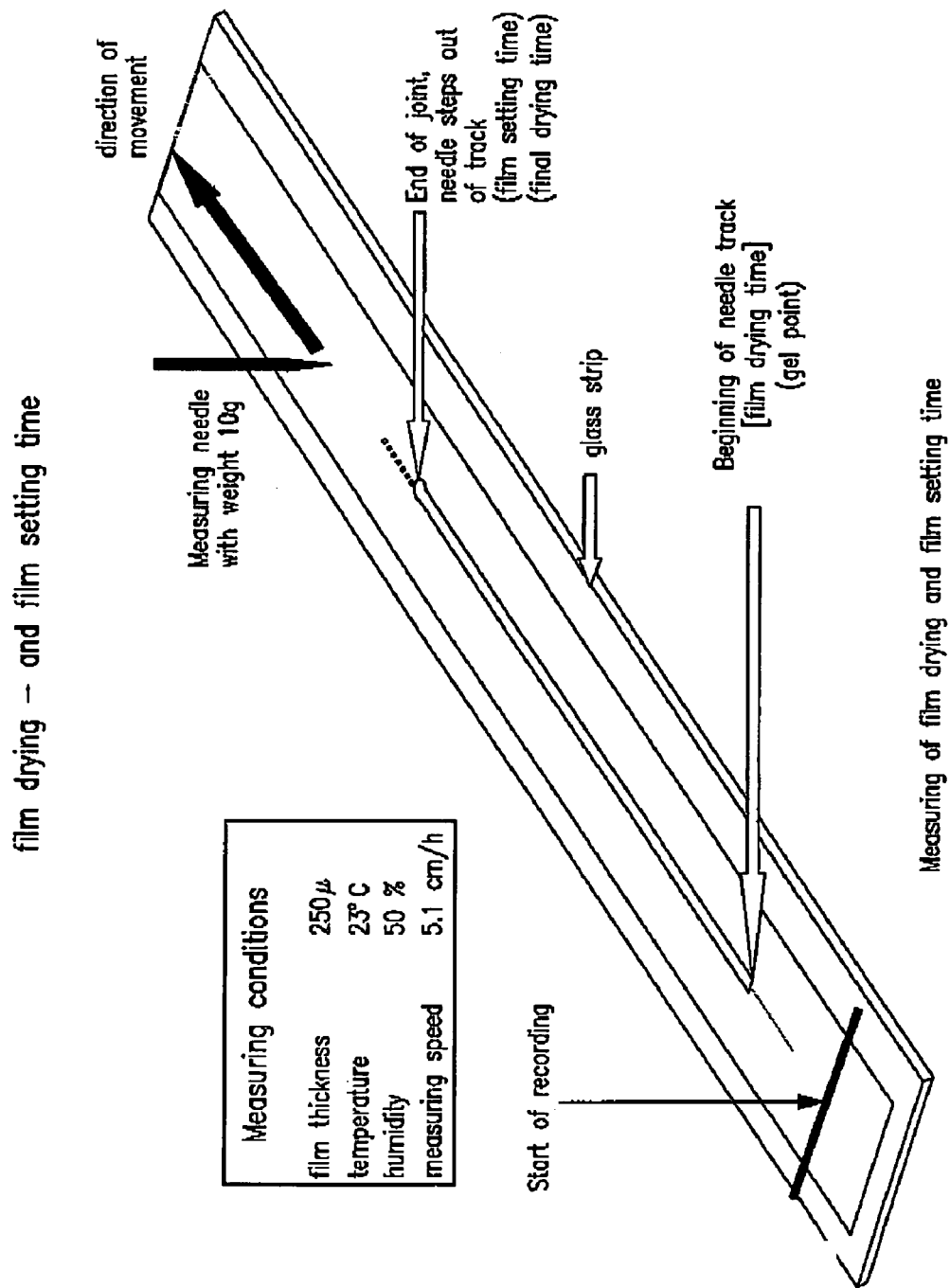
FIG. 1 is a representational depiction of a measurement method for evaluating properties of dispersions in accordance with an embodiment of the present invention.

As used herein, the singular terms "a" and "the" are synonymous, and used interchangeably, with "one or more" and "at least one." Accordingly, for example, reference to "a dispersion" herein or in the appended claims can refer to a single dispersion or more than one dispersion. Additionally, all numerical values, unless otherwise specifically noted, are understood to be modified by the word "about."

Suitable polyvinylacetates and polyvinylacetate copolymers are commercially available. The companies "Air Products" (Airlex®, Vinac®, "Celanese" (Mowilith®) and "Wacker" (Vinnapas®) may be mentioned, by way of example, as suppliers.

The polymerization of vinyl acetate, alone or in combination with other monomers, has been well-known for a long time and has been described in many publications such as e.g. by H. Bartl in Methoden der organischen Chemie (Houben-Weyl) vol. XIV/1 Makromolekulare Stoffe Thieme Verlag Stuttgart, 4th edition, 1961, p. 905 et seq. Apart from bulk, solution and suspension polymerization, emulsion polymerization is preferred on an industrial scale, wherein the vinyl ester of acetic acid is mainly used as the vinyl ester.

Copolymerization succeeds using other vinyl compounds such as e.g. vinyl chloride, ethylene and higher vinyl esters, such as vinyl benzoate, as well as with acrylates and unsaturated dicarboxylic acids such as maleic anhydride or acrylic acid. The solubility, processability, ability to take up colors, adhesion or stability of the emulsion can be improved in this way. Polyvinylacetate homopolymers or copolymers with ethylene are particularly suitable.

Aqueous silicon dioxide dispersions have been known for a long time. They are available in different forms, depending on the method of production.

Silicon dioxide dispersions (b) that are suitable for use in the invention may be obtained from silica sol, silica gel, pyrogenic silicas, precipitated silicas or mixtures of the forms mentioned.

Silica sols are colloidal solutions of amorphous silicon dioxide in water; these are also called silicon dioxide sols but are mostly called silica sols for short. The silicon dioxide is present in the form of spherical particles that are hydroxylated at the surface. The particle diameter of the colloid particles is generally 1 to 200 nm, wherein the specific BET surface area correlating to the particle size is 15 to 2000 $m^2/g$ (determined by the method described by G. N. Sears in Analytical Chemistry, vol. 28, no. 12, 1981-1983, December 1956). The surface of the $SiO_2$ particles carries a charge, that is balanced by a corresponding counter ion that leads to stabilization of the colloidal solution. Alkaline stabilized silica sols have a pH of 7 to 11.5 and contain, for example, small amounts of $Na_2O$, $K_2O$, $Li_2O$, ammonia, organic nitrogenous bases, tetraalkylammonium hydroxides or alkali metal or ammonium aluminates as the alkalizing agent. Silica sols may also be available as weakly acidic metastable colloidal solutions. Furthermore it is possible to produce cationically adjusted silica sols by coating the surface with $Al_2(OH)_5Cl$. The solids content of silica sols is preferably 5 to 60 wt. % of $SiO_2$.

The production process for silica sols substantially involves the production steps dealkalization of waterglass by means of ion exchange, adjustment to and stabilization at the particular particle size (distribution) required for the $SiO_2$ particles, adjustment of the particular SiO2 concentration required and optionally surface modification of the $SiO_2$ particles, such as for example with $Al_2(OH)_5Cl$. In none of these steps do the $SiO_2$ particles leave the colloidally dissolved state. This explains the presence of discrete primary particles.

Silica gels are understood to be colloidal shaped or non-shaped silicas of elastic to solid consistency with large to small pore structures. The silica is present in the form of highly condensed polysilicic acid. Siloxane and/or silanol groups are located at the surface. Silica gels are produced from waterglass by reaction with mineral acids.

Furthermore, pyrogenic silicas and precipitated silicas have to be differentiated. In the precipitation process, water is initially introduced and then waterglass and an acid, such as $H_2SO_4$, are added simultaneously. Colloidal particles are formed in this way and these agglomerate and grow to form agglomerates as the reaction progresses. The specific surface area is generally, 30 to 800 $m^2/g$ and the primary particle size is 5 to 100 nm. The primary particles in these silicas, that are present as solids, are generally firmly crosslinked to form secondary agglomerates. The specific surface area(s) cited above and those mentioned in the following are measured in accordance with DIN 66131.

Pyrogenic silicas can be produced by flame hydrolysis or with the aid of the electric arc process. The major method of synthesis of pyrogenic silica is flame hydrolysis in which tetrachlorosilane is decomposed in an oxyhydrogen flame. The silica formed in this way is X-ray amorphous. Pyrogenic silicas have far fewer OH groups at their virtually pore-free surface than precipitated silicas. Pyrogenic silica prepared by flame hydrolysis generally has a specific surface are of 50 to 600 m²/g and a primary particle size of 5 to 50 nm; silica prepared by the electric arc process has a specific surface area of 25 to 300 m²/g and a primary particle size of 5 to 500 nm.

Further data on the synthesis and properties of silica in solid form can be obtained, for example, from K. H. Büchel, H.-H. Moretto, P. Woditsch "Industrielle Anorganische Chemie", Wiley VCHI Verlag, 1999, section 5.8.

If a $SiO_2$ raw material present as an isolated solid, such as for example a pyrogenic or precipitated silica, is used for the polymer dispersion according to the invention, then this is converted into an aqueous $SiO_2$ dispersion by a dispersion process.

Dispersers from the prior art are used to produce the silicon dioxide dispersions, preferably those that are suitable for producing high shear rates such as e.g. Ultratorrax or high-speed stirrer discs.

Those aqueous silicon dioxide dispersions (b) that contain $SiO_2$ particles with a primary particle size of 1 to 400 nm, preferably 5 to 100 nm and particularly preferably 8 to 60 nm are preferably used. In the event that precipitated silicas are used, these are milled in order to reduce the size of the particles.

Preferred polymer dispersions according to the invention are those in which the $SiO_2$ particles in silicon dioxide dispersion (b) are present as discrete non-crosslinked primary particles.

It is also preferred that the $SiO_2$ particles have hydroxyl groups available at the surfaces of the particles.

Aqueous silica sols are particularly preferably used as aqueous silicon dioxide dispersions. Suitable silica sols are also commercially available.

In preferred embodiments of the present invention, the dispersions according to the invention also contain: (c) an OH group-containing oligomer or polymer.

In the context of the invention, OH group-containing oligomers or polymers are understood to be all linear or cyclic oligomers or polymers that contain hydroxyl groups in the oligomer or polymer chain and are either available as aqueous dispersions or are soluble in water. In the context of the invention, oligomers are understood to be those compounds with up to 10 repeating units and polymers are understood to be those with more than 10 repeating units, wherein in both cases the repeating units may be identical or different. Preferred examples of OH group-containing polymers are hydroxyacrylates, hydroxyalkyl celluloses, hydroxyl group-containing polychloroprenes or polyvinylalcohols; preferred examples of OH group-containing oligomers are cyclodextrins. Preferred OH group-containing oligomers or polymers, in the context of the invention, are cyclodextrins.

Suitable cyclodextrins are unsubstituted and substituted cyclodextrins.

Preferred cyclodextrins are α, β and γ-cyclodextrins and their ester, alkyl ether, hydroxyalkyl ether, alkoxycarbonylalkyl ether, carboxyalkyl ether derivatives or the salts thereof The following are particularly preferred: methyl-α-cyclodextrin, methyl-β-cyclodextrin, methyl-γ-cyclodextrin, ethyl-β-cyclodextrin, butyl-α-cyclodextrin, butyl-β-cyclodextrin, butyl-γ-cyclodextrin, 2,6,dimethyl-α-cyclodextrin, 2,6-dimethyl-β-cyclodextrin, 2,6-dimethyl-γ-cyclodextrin, 2,6-diethyl-β-cyclodextrin, 2,6,-dibutyl-β-cyclodextrin, 2,3, 6-trimethyl-α-cyclodextrin, 2,3,6-trimethyl-β-cyclodextrin, 2,3,6-trimethyl-γ-cyclodextrin, 2,3,6-trioctyl-α-cyclodextrin, 2,3,6-trioctyl-β-cyclodextrin, 2,3,6-triacetyl-α-cyclodextrin, 2,3,6-triacetyl-β-cyclodextrin, 2,3,6-triacetyl-γ-cyclodextrin, (2-hydroxy)propyl-α-cyclodextrin, (2-hydroxy) propyl-β-cyclodextrin, (2-hydroxy)propyl-γ-cyclodextrin, partially or completely acetylated, methylated and succinylated α-, β- and γ-cyclodextrin, 2,6-dimethyl-3-acetyl-β-cyclodextrin and 2,6-dibutyl-3-acetyl-β-cyclodextrin.

The mono-, di- or triether-substituted, mono-, di- or triester-substituted or monoester/diether-substituted derivatives are generally obtained by the etherification of α, β and γ-cyclodextrin using alkylating agents such as for example dimethyl sulfate or alkyl halides with 1 to 30 carbon atoms such as for example methyl, ethyl, propyl, butyl, pentyl, hexyl, heptyl, octyl chloride, bromide or iodide and/or esterification with acetic acid or succinic acid in the presence of acids.

Cyclodextrins are also commercially available, for example from the company Wacker (Cavamax®).

Dispersions according to the invention preferably have a dispersed polymer content of 30 to 70 wt. %. The total proportion of dispersed polymers (a) and (c) is particularly preferably 55 to 99 wt.% and that of the silicon dioxide dispersion (b) 1 to 45 wt. %, wherein the percentage data refers to the weight of non-volatile components and add up to 100 wt. %. Those dispersions according to the invention in which the total proportion of dispersed polymers (a) and (c) is 80 wt. % to 96 wt. % and that of the silicon dioxide dispersion is 20 wt. % to 4 wt. % are very particularly preferred, wherein the percentage data refers to the weight of non-volatile components and add up to 100 wt. %.

The total proportion of dispersed polymers (a) and (c) is distributed in such a way that 70 wt. % to 100 wt. % comprises polyvinylacetate (a) and 0 to 30 wt. % comprises OH group-containing polymer dispersions (c).

Dispersions according to the invention may optionally also contain other dispersions such as e.g. polyacrylate, polyvinylidene chloride, polybutadiene or styrene/butadiene dispersions in proportions of up to 30 wt. %.

Dispersions according to the invention may contain other additives and optionally coating and adhesive auxiliary agents.

For example, fillers such as quartz flour, quartz sand, barytes, calcium carbonate, chalk, dolomite or talcum, optionally together with wetting agents, for example polyphosphates such as sodium hexametaphosphate, naphthalinesulfonic acid, ammonium or sodium salts of polyacrylic acid, may be added, wherein the fillers are added in amounts of 10 to 60 wt. %, preferably 20 to 50 wt. %, and the wetting agents in amounts of 0.2 to 0.6 wt. %, all data being with respect to the non-volatile components. Other suitable, optionally used, auxiliary agents are, organic thickening agents such as cellulose derivatives, alginates, starch, starch derivatives, polyurethane thickening agents or polyacrylic acid, being used for example in amounts of 0.01 to 1 wt. %, with respect to the non-volatile components, or inorganic thickening agents such as for example bentonites, being used in amounts of 0.05 to 5 wt. %, with respect to the non-volatile components. For preservation purposes, fungicides may also be added to dispersions according to the invention. These are used in amounts of 0.02 to 1 wt. %, with respect to the non-volatile components. Suitable fungicides are, for example, phenol and cresol derivatives or organotin compounds. Tackifying resins, so-called adhesive resins, such as e.g. unmodified or modified natural resins such as colophonium ester, hydrocarbon resins or synthetic resins such as phthalate resins may optionally be added in dispersed form to the polymer dispersion according to the invention (see e.g. "Klebharze", R. Jordan, R. Hinterwaldner, pp. 75-115, Hinterwaldner Verlag Munich 1994). Alkylphenol resin and terpenephenol resin dispersions with softening points higher than 70° C., particularly preferably higher than 110° C., are preferred. Plasticizers, such as for example those based on adipate, phthalate or phosphate, may also be added to dispersions according to the invention, in amounts of 0.5 to 10 parts by wt., with respect to the non-volatile components.

It is also possible to use an organic solvent such as for example aromatic hydrocarbons, such as e.g. toluene or xylene, ethers such as e.g. dioxan, ketones such as e.g.

acetone or methylethyl ketone, esters such as e.g. butyl acetate or ethyl acetate or mixtures of these, in amounts of up to 10 wt. %, with respect to the weight of the entire adhesive formulation. Such added amounts of organic solvent may be used for example to improve adhesion to the substrate being coated or bonded or to dissolve the previously described optionally contained further additives or optional coating and adhesive auxiliary agents.

To prepare polymer dispersions according to the invention, the ratios by weight of the individual components are chosen so that the resulting dispersion according to the invention contains components (a), (b) and optionally (c) as well as optional further additives or coating or adhesive auxiliary agents in the previously stated amounts.

The individual components may be brought together in basically any sequence at all. In preferred embodiments containing the OH group-containing component (c), premixing of the aqueous silicon dioxide dispersion (b) with the OH group containing oligomer(s) or polymer(s) (c) is particularly advantageous, wherein substance (c) is added in the form of a dispersion or in the case of cyclodextrin as a solid or as an aqueous solution.

Therefore, the present invention also provides a process for preparing the polymer dispersions according to the invention, wherein the silicon dioxide dispersion (b) is optionally mixed with the dispersion containing at least one OH group-containing oligomer or polymer (c), optional additives and optional coating or adhesion auxiliary agents and then the dispersion (a) containing polyvinylacetate and/or at least one polyvinylacetate copolymer is admixed., wherein polyvinylacetate and/or polyvinylacetate copolymer is admixed as complete dispersion or as solid.

The aqueous intermediate dispersions, of aqueous silicon dioxide dispersion (b) and the OH group containing oligomer(s) or polymer(s) (c), prepared in the context of this preferred variant are stable and are also provided by the present invention. In particular, the intermediate dispersions comprise aqueous silicon dioxide dispersion (b) and one or more cyclodextrin(s).

Dispersions according to the invention are outstandingly suitable as adhesives or coatings for many different substrates. For example, substrates such as wood, paper, plastics, textiles, leather, rubber or made of inorganic materials such as ceramic, earthenware, glass fibres or cement can be coated or bonded. When bonding substrates, substrates of the same or different type may be bonded. Polymer dispersions according to the invention exhibit rapid setting properties and high initial strength compared to known aqueous polymer dispersions, despite the high water content, and the resulting dry coating or adhesive films have a high water resistance and thermal stability.

Thus the present invention also provides use of polymer dispersions according to the invention as adhesives, for example in the bookbindery, in the bonding of wood, as adhesive for wall tiles or as coating agents for packaging.

Polymer dispersions according to the invention can be applied in well-known ways, e.g. by brushing, casting, spreading, spraying, rolling or dipping. The coating or adhesive film can be dried at room temperature or at elevated temperature.

The present invention also provides substrates that are coated or bonded with a polymer dispersion according to the invention.

The invention will now be described in further detail with reference to the following non-limiting examples.

EXAMPLES

The following abbreviations are used in the examples given below:
VAc=vinyl acetate
PVAc=polyvinylacetate
E=ethylene
A=acrylate
OS=surface-active substance
PVAL=polyvinylalcohol
CD=cellulose derivative.
1.1 Substances Used

TABLE 1

Polyvinylacetate dispersions from Air Products (Vinac ® series)

| | Polyvinylacetate | | | |
|---|---|---|---|---|
| | 1 | 2 | 3 | 4 |
| Name | Vinac ®DPN15 | Vinac ®DP600* | Vinac ®DP55 | Vinac ®DP500 |
| Monomer unit | VAc | VAc | VAc | VAc |
| Solids content(%) | 52 | 60 | 55 | 50 |
| Viscosity (mPas) | 15000 ± 3000 | 35000 ± 10000 | 3000 ± 600 | 35000 ± 10000 |
| pH | 2.5-3.5 | 4-5 | 4-5 | 4-5 |
| Stabiliser | PVAL | PVAL | PVAL | PVAL |

*previous name: Vinac ®H60hjgdhjdgh

TABLE 2

Polyvinylacetate dispersions from Air Products (Airflex ® series)

| | Polyvinylacetate | | | |
|---|---|---|---|---|
| | 5 | 6 | 7 | 8 |
| Name | Airflex ®EP17 | Airflex ®EAF60 | Airflex ®EP400 | Airflex ®EZ3010 |
| Monomer unit | VAc/E | VAc/E/A | VAc/E | VAc/E |
| Solids content(%) | 60 | 60 | 55 | 55 |
| Viscosity (mPas) | 3500 ± 1000 | 12000 ± 4000 | 2400 ± 400 | 4300 ± 1600 |
| pH | 4-5 | 4-5 | 4-5 | 4-5 |
| Stabiliser | PVAl | OS | PVAL | CD + OS |

TABLE 2-continued

Polyvinylacetate dispersions from Air Products (Airflex ® series)

| | Polyvinylacetate | | | |
|---|---|---|---|---|
| | 5 | 6 | 7 | 8 |
| Field of use (Manufacturer's data) | DIY, bonding of cardboard, plastics, foils, book-binding | Pressure sensitive adhesive, floor coverings | Bonding of cardboard, plastics, foils, book-binding, foams | For low-emission interior paint |

TABLE 3

PVAc/PVAL dispersions from Celanese Emulsions GmbH, Frankfurt, Germany

| Polyvinylacetate | 9 |
|---|---|
| Name | Monwilith LDL 2555 W |
| Monomer unit | VAc |
| Solids content(%) | 50 |
| Viscosity (mPas) | 12000 ± 3000 |
| pH | 3.15 ± 0.35 |
| Glass transition point (Tg in ° C.) | +27 |
| Stabiliser | PVAL |
| Field of use (Manufacturer's data) | Water resistant bonding (group D3) for the wood and furniture sector |

TABLE 4

Cyclodextrin from Wacker, Burghausen, Germany

| Cyclodextrin | 10 |
|---|---|
| Name | Cavamax ® W6 |
| Composition | α-cyclodextrin (cyclohexaamylase) |
| Solids, content of α-cyclodextrin (%) | 90 |
| CAS No. | 10016-20-3 |
| Molecular weight | 973 |

TABLE 5

Silicon dioxide dispersions (silica sols) from H. C. Starck, Leverkusen, Germany

| | Silica sol | | | |
|---|---|---|---|---|
| | 11 | 12 | 13 | 14 |
| Name | Levasil ® 50 | Levasil ® 100 | Levasil ® 200 | Levasil ® 300 |
| Concentration (%) | 50 | 45 | 40 | 30 |
| Density (g/cm³) | 1.39 | 1.343 | 1.295 | 1.208 |
| pH | 9 | 10 | 9 | 10 |
| Specific surface area (m²/g) | 50 | 100 | 200 | 300 |
| Mean particle size (nm)* | 55 | 30 | 15 | 9 |

*Mean value, calculated from the specific surface area

TABLE 6

Auxiliary agents used

| Name | Desmodur ® DN |
|---|---|
| Manufacturer | Bayer Material Science, Leverkusen, Germany |
| Composition | Hydrophilic aliphatic polyisocyanate based on hexamethylene diisocyanate (HDI). |

TABLE 6-continued

Auxiliary agents used

| Solids, content of Desmodur DN (%) | 100 |
|---|---|

1.2 Methods of Measurement 1.2.1. Thermomechanical Analysis (TMA)

The dispersions are dried as a film in a Teflon dish, to be precise for 3 days at room temperature, 1 hour at 80° C. and then another 3 days at room temperature, wherein a film with a thickness of 1.0 mm to 1.5 mm should be produced. A DMA 7 instrument from Perkin Elmer was used for the measurements under a load of 500 mN and with a temperature program from −100° C. to +240° C., at a rate of increase of 5°/min. The depth of penetration of the measurement head at the appropriate temperature was measured. The softer the film, the deeper penetrated the measurement head into the substrate. This measurement correlated with determining the thermal stability of bonding in a heating cupboard.

Example of such a thermal stability test: The test specimens are loaded with 4 kg and brought to a constant temperature of 40° C. over the course of 30 min in a heating cupboard. Then the test samples are heated up to 150° C. at a linear rate of heating of 0.5° C./min. The softening temperature. i.e. the temperature in ° C. at which the bond fails under a 4 kg load, is recorded.

1.2.2. Determination of the Film-Formation and Setting Times of Adhesive Dispersion Films.

Principle of measurement: With reference to FIG. 1, two carriages are moved at constant speed over a glass plate on which an adhesive film is found. A needle is mounted at right angles to the glass plate on one moveable arm on the carriage and a weight is fitted thereto. During the first phase of the drying process, the dispersion flows together again behind the needle. The start of the film-formation time is defined by separation of the film by the needle (phase 2). As the viscosity of the film increases above the vertical force of the weight, then the needle jumps out of the film and continues to run on the surface of the film (phase 3). This time is defined as the film drying time.

Performing the measurement: The glass plate is cleaned with ethyl acetate, the adhesive film is applied with a 250 μm spreader, the needle is loaded with a weight of 10 g and the measurement is started. The speed is 5.1 cm/h. The measurements are performed in a conditioning chamber at 23° C. and at a relative humidity of 50%.

1.2.3. Determining the Tensile Shear Strength

Determining the shear strength of wood-wood bonds under stress due to 5 tensile forces in the direction of the bonded surface. Material: Beech (40×20×4 mm)

1.2.3.1. Preparing the Test Specimens:

Adhesives according to the invention are applied to a planed beech plate (in accordance with DIN 53-254), using a brush. The adhesive is applied to both faces of the beech test specimen. After a drying time of 30 minutes at ambient temperature, a 10 second layer of adhesive is applied on top of the first and then dried for 60 minutes at ambient temperature. After completion of the drying time, two specimens are bonded so that there is an overlap of 20×10 mm. The test specimens are then pressed together in a press for 10 seconds at a pressure of 4 bar.

1.2.3.2. Determining the Tensile Shear Strength

The adhesive force is measured using the end pull-off device in a Zwick tensile test machine model 1475 (universal test machine, standard test instrument in adhesive engineering) with a take-off speed of 100 mm/min until the joined (bonded) parts separate. The force is measured in $N/mm^2$.

1.2.4. Determining the Water Resistance of the Bonds

The test specimens are stored for 7 days, initially for 6 hours each day at 100° C. and then for 2 hours each day in cold water and then at RT, followed by a further 7 days at RT.

The tensile shear strength is then determined as described in 1.2.3.2.

1.3. Preparing Polymer Dispersions According to the Invention

To prepare polymer dispersions according to the invention, dispersion (a) containing polyvinylacetate and/or at least one polyvinylacetate copolymer is initially placed in a beaker. The silicon dioxide dispersion (b) and the dispersion containing at least one OH group-containing oligomer or polymer (c) are then added one after the other with stirring. After 30 minutes, the formulation is used for the trials.

The data in Tables 7a-13 a are given in parts by weight of the relevant dispersions.

1.4. Examples

TABLE 7a

Compositions of the dispersions

| | Trial | | | | | | | |
|---|---|---|---|---|---|---|---|---|
| | 1* | 2 | 3 | 4 | 5* | 6 | 7 | 8 |
| PVAc # 1 (Table 1) | 100 | 100 | 100 | 100 | — | — | — | — |
| PVAc # 9 (Table 3) | — | — | — | — | 100 | 100 | 100 | 100 |
| Silica sol # 11 (Table 5) | | 30 | | | | 30 | | |
| Silica sol # 12 (Table 5) | | | 30 | | | | 30 | |
| Silica sol # 13 (Table 5) | | | | 30 | | | | 30 |

TABLE 7b

Tensile shear strength of bonds after storage (substrate wood/wood)

| | Trial | | | | | | | |
|---|---|---|---|---|---|---|---|---|
| | 1* | 2 | 3 | 4 | 5* | 6 | 7 | 8 |
| 1 day [N/mm] | 13.0 | 14.5 | 14.2 | 14.1 | 13.0 | 13.5 | 13.4 | 13.8 |
| 7 days [N/mm] | 14.4 | 18.2 | 17.6 | 17.7 | 12.8 | 14.2 | 17.6 | 16.8 |
| 14 days [N/mm] | 14.0 | 18.0 | 17.2 | 17.4 | 14.1 | 15.7 | 17.2 | 17.3 |

*Comparison examples

TABLE 8a

Compositions of the dispersions

| | Trial | | | | | |
|---|---|---|---|---|---|---|
| | 9* | 10 | 11 | 12* | 13 | 14 |
| PVAc # 5 (Table 2) | 100 | 100 | 100 | — | — | — |
| PVAc # 6 (Table 2) | — | — | — | 100 | 100 | 100 |
| Silica sol # 13 (Table 5) | | 30 | | | 30 | |
| Silica sol # 14 (Table 5) | | | 30 | | | 30 |

TABLE 8b

Tensile shear strength of bonds after storage (substrate wood/wood)

| | Trial | | | | | |
|---|---|---|---|---|---|---|
| | 9* | 10 | 11 | 12* | 13 | 14 |
| 1 day [N/mm] | 4.6 | 5.9 | 6.8 | 1.4 | 2.4 | 1.9 |
| 7 days [N/mm] | 5.2 | 6.6 | 7.7 | 1.3 | 2.7 | 2.1 |
| 14 days [N/mm] | 5.0 | 7.4 | 8.9 | 1.2 | 2.6 | 2.4 |

*Comparison examples

Compared with the use of pure polyvinylacetate dispersions in accordance with comparison examples 1, 5, 9 and 12, substrates bonded with polymer dispersions according to the invention have much higher shear strengths.

TABLE 9a

Composition of the dispersions

| | Trial | | | | |
|---|---|---|---|---|---|
| | 15* | 16 | 17 | 18 | 19 |
| PVAc # 1 (Table 1) | 100 | 100 | 100 | 100 | 100 |
| Crosslinking agent Desmodur ® DN | — | 5 | — | — | — |
| Silica sol # 11 (Table 5) | | | 30 | | |
| Silica sol # 12 (Table 5) | | | | 30 | |
| Silica sol # 13 (Table 5) | | | | | 30 |

TABLE 9b

Water resistance of bonds (substrate wood/wood)

| | Trial | | | | |
|---|---|---|---|---|---|
| | 15* | 16 | 17 | 18 | 19 |
| Tensile shear strength after storage in water [N/mm] | 14.3 | 16.1 | 15.4 | 16.8 | 16.3 |

*Comparison example

Compared with the use of a pure polyvinylacetate dispersion in accordance with comparison example 15, the substrates bonded with the polymer dispersions according to the invention have much higher shear strengths after storage in water and thus higher water resistance. The use of the crosslinking agent Desmodur DN to produce a higher strength is not required.

TABLE 10a

Compositions of the dispersions

| | Trial | | | | | |
|---|---|---|---|---|---|---|
| | 20* | 21 | 22 | 23 | 24 | 25 |
| PVAc # 1 (Table 1) | 100 | 100 | 100 | — | — | — |
| PVAc # 9 (Table 3) | — | — | — | 100 | 100 | 100 |
| Silica sol # 12 (Table 5) | | 30 | | | 30 | |
| Silica sol # 13 (Table 5) | | | 30 | | | 30 |

TABLE 10b

Data on film-formation & film drying in accordance with test method 1.2.2

| | Trial | | | | | |
|---|---|---|---|---|---|---|
| | 20* | 21 | 22 | 23 | 24 | 25 |
| Film-formation time (min) | 8.0 | <1 | <1 | 8.4 | <1 | 3.2 |
| Film drying time (min) | 29 | 5.2 | 5.6 | 26.8 | 5.4 | 7.8 |

*Comparison example

Compared with the pure polyvinylacetate dispersion in accordance with comparison example 20, polymer dispersions according to the invention have much shorter film-formation and drying times.

TABLE 11a

Compositions of the dispersions thermomechanical properties

| | Trial | | | | | |
|---|---|---|---|---|---|---|
| | 26* | 27 | 28 | 29* | 30 | 31 |
| PVAc # 1 (Table 1) | 100 | 100 | 100 | — | — | — |
| PVAc # 9 (Table 3) | — | — | — | 100 | 100 | 100 |
| Silica sol # 11 (Table 5) | | 30 | | | 30 | |
| Silica sol # 13 (Table 5) | | | 30 | | | 30 |

TABLE 11b

Thermomechanical properties

| | Trial | | | | | |
|---|---|---|---|---|---|---|
| | 26* | 27 | 28 | 29* | 30 | 31 |
| Residual depth of penetration of the measurement head at 100° C. (%) | 36 | 88 | 80 | 24 | 68 | 90 |

*Comparison examples

The residual depth of penetration is the length of the measurement head that has not penetrated.

Figure 2:
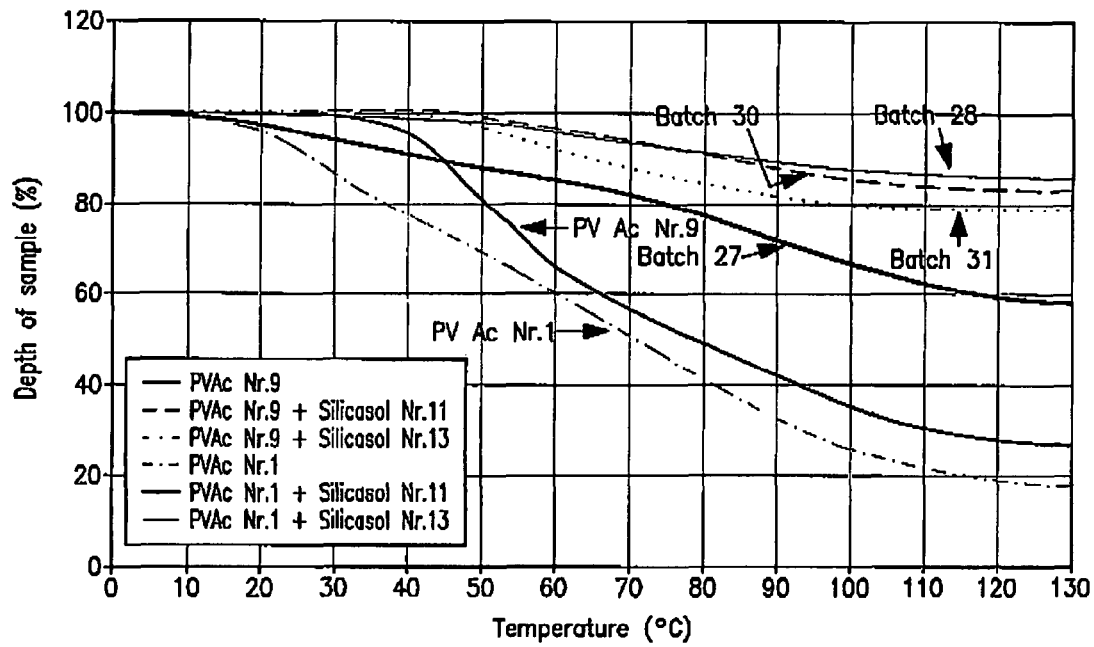
FIG. 2 is a graphical representation of comparative thermal stability of films prepared in accordance with embodiments of the invention and films prepared in accordance with prior art materials.

Compared with the use of pure polyvinyl acetate dispersions in accordance with comparison example 26 and 29, films made with polymer dispersions according to the invention have a much higher resistance to thermal stress. This property correlates with the thermal stability of the polymer films. FIG. 2 gives a detailed comparison of changes in the individual measurements.

TABLE 12a

Composition of the dispersions

| | Trial | | | |
|---|---|---|---|---|
| | 32* | 33 | 34* | 35 |
| PVAc # 5 (Table 2) | 100 | 100 | 100 | 100 |
| Cyclodextrin # 10 (Table 4) | — | — | 10 | 10 |
| Silica sol # 14 (Table 5) | — | 30 | — | 30 |

*Comparison examples

TABLE 12b

Thermomechanical properties

| | Trial | | | |
|---|---|---|---|---|
| | 32* | 33 | 34* | 35 |
| Residual depth of penetration of the measurement head at 100° C. (%) | 7 | 66 | 26 | 80 |
| Residual depth of penetration of the measurement head is 50% at a temp. of: (° C.) | 57 | 180 | 66 | 242 |
| Residual depth of penetration of the measurement head is 90% at a temp. of: (° C.) | 94 | 260 | 126 | 265 |

*Comparison example

Figure 3:
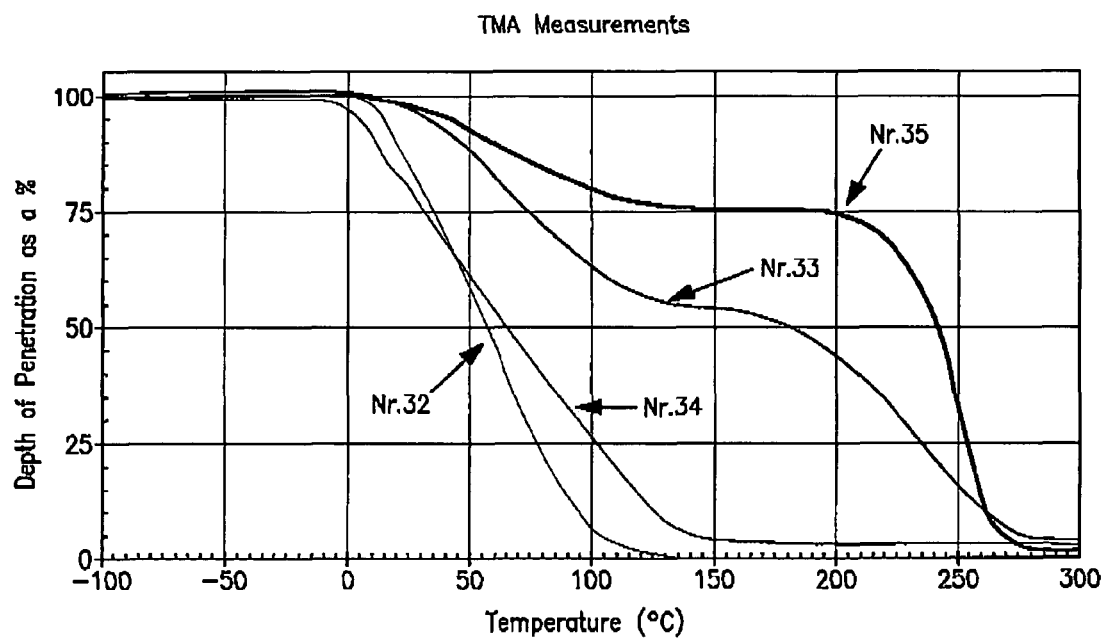
FIG. 3 is a graphical representation of comparative thermal stability of films prepared in accordance with embodiments of the invention and films prepared in accordance with prior art materials.

Compared with the use of pure polyvinyl acetate dispersions in accordance with comparison example 32 and 34, films made with polymer dispersions according to the invention have a much higher resistance to thermal stress. This property correlates with the softening point and is a measure of the thermal stability of the polymer films. Surprisingly high values for thermal stability are shown by the polymer film made from the special embodiment of the polymer dispersion according to the invention with cyclodextrin (trial 35). The observed effect extends well beyond a purely additive effect. FIG. 3 gives a detailed comparison of changes in the individual measurements.

TABLE 13a

Composition of the dispersions

| | Trial | | | | | | | | | |
|---|---|---|---|---|---|---|---|---|---|---|
| | 36* | 37 | 38* | 39 | 40* | 41 | 42* | 43 | 44* | 45 |
| PVAc # 2 (Table 1) | 100 | 100 | | | | | | | | |
| PVAc # 3 (Table 1) | — | — | 100 | 100 | | | | | | |
| PVAc # 4 (Table 1) | | | | | 100 | 100 | | | | |
| PVAc # 7 (Table 2) | | | | | | | 100 | 100 | | |
| PVAc # 8 (Table 2) | | | | | | | | | 100 | 100 |
| Silica sol # 13 (Table 5) | | 30 | | 30 | | 30 | | 30 | | 30 |

TABLE 13b

| Thermomechanical properties | | | | | | | | | | |
|---|---|---|---|---|---|---|---|---|---|---|
| | Trial | | | | | | | | | |
| | 36* | 37 | 38* | 39 | 40* | 41 | 42* | 43 | 44* | 45 |
| Residual depth of penetration at 100° C. (%) | 58 | 92 | 55 | 85 | 60 | 85 | 38 | 78 | 0 | 35 |

*Comparison examples

Figure 4A:
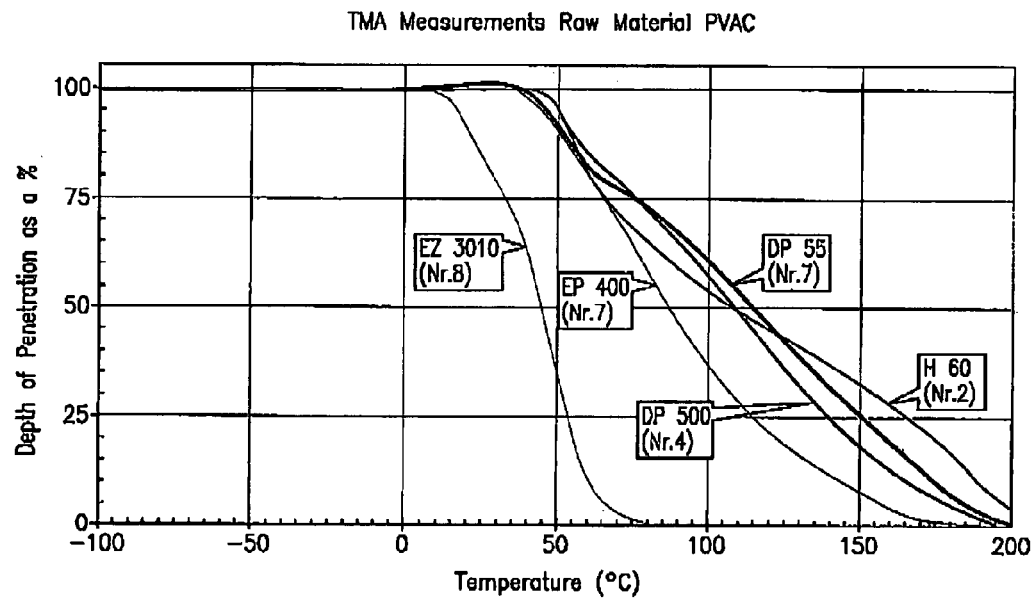
FIG. 4a is a graphical representation of thermal stability of pure polyvinylacetate-based films prepared in accordance with the prior art.
Figure 4B:
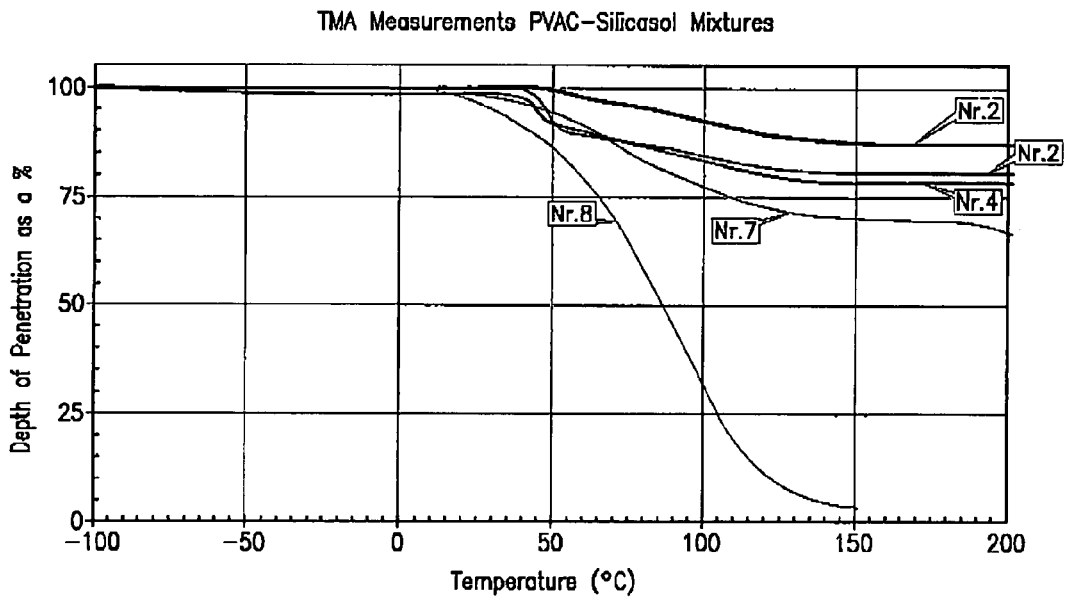
FIG. 4b is a graphical representation of comparative thermal stability of films prepared in accordance with embodiments of the invention.

With reference to FIG. 4a and FIG. 4b, compared with the use of pure polyvinyl acetate dispersions in accordance with comparison examples 36, 38, 40, 42 and 44, films made with polymer dispersions according to the invention have a much higher resistance to thermal stress. This property correlates with the softening point and is a measure of the thermal stability of the polymer films, It will be appreciated by those skilled in the art that changes could be made to the embodiments described above without departing from the broad inventive concept thereof, It is understood, therefore, that this invention is not limited to the particular embodiments disclosed, but it is intended to cover modifications within the spirit and scope of the present invention as defined by the appended claims.

What is claimed is:

1. An aqueous polymeric dispersion comprising a mixture of: (a) a component selected from the group consisting of polyvinylacetates, polyvinylacetate copolymers, and combinations thereof; (b) $SiO_2$ particles having an average particle diameter of 1 to 400 nm; and (c) an OH group-containing oligomer or polymer, wherein the OH group-containing oligomer or polymer comprises a cyclodextrin, wherein the dispersed polymers (a) and (c) are present in a total amount of 55 to 99 wt. % and the silicon dioxide (b) is present in an amount of 1 to 45 wt %, wherein the percentages by weight are based on total non-volatile components and add up to 100 wt %.

2. The dispersion according to claim 1, wherein the $SiO_2$ particles have an average particle diameter of 5 to 100 nm.

3. The dispersion according to claim 1, wherein the $SiO_2$ particles have an average particle diameter of 8 to 60 nm.

4. The dispersion according to claim 1, wherein the $SiO_2$ particles comprise discrete non-crosslinked primary particles.

5. The dispersion according to claim 1, wherein the $SiO_2$ particles comprise an aqueous silica sol.

6. The dispersion according to claim 5, wherein the component comprises particles having an average particle diameter of 70 to 300 nm.

7. The dispersion according to claim 6, wherein the SiO2 particles have an average particle diameter of 8 to 60 nm.

8. The dispersion according to claim 1, wherein the component comprises particles having an average particle diameter of 70 to 300 nm.

9. A process comprising:
(a) providing a first aqueous dispersion comprising $SiO_2$ particles having an average particle diameter of 1 to 400 nm; and
(b) admixing (i) a component selected from the group consisting of polyvinylacetates, polyvinylacetate copolymers, and combinations thereof, and (ii) an OH group-containing oligomer or polymer, wherein the OH group-containing oligomer or polymer comprises a cyclodextrin, with the first aqueous dispersion, wherein the components (i) and (ii) are present in a total amount of 55 to 99 wt. % and the silicon dioxide is present in an amount of 1 to 45 wt %, wherein the percentages by weight are based on total non-volatile components and add up to 100 wt %.

10. The process according to claim 9, wherein the component is admixed as a solid with the first aqueous dispersion.

11. The process according to claim 9, wherein the component is prepared as a second dispersion prior to admixing with the first aqueous dispersion.

12. The process according to claim 9, wherein the OH group-containing oligomer or polymer is combined with the first aqueous dispersion prior to admixing the component with the first aqueous dispersion.

13. A method comprising:
(a) providing a first substrate having a surface;
(b) applying an aqueous polymeric dispersion to the surface, wherein the aqueous polymeric dispersion comprises a mixture of: (a) a component selected from the group consisting of polyvinylacetates, polyvinylacetate copolymers, and combinations thereof; (b) $SiO_2$ particles having an average particle diameter of 1 to 400 nm; and (c) an OH group-containing oligomer or polymer, wherein the OH group-containing oligomer or polymer comprises a cyclodextrin, wherein the dispersed polymers (a) and (c) are present in a total amount of 55 to 99 wt. % and the silicon dioxide (b) is present in an amount of 1 to 45 wt %, wherein the percentages by weight are based on total non-volatile components and add up to 100 wt %; and
(c) drying the aqueous polymeric dispersion to form a film.

14. The method according to claim 13, further comprising disposing a second substrate on the aqueous polymeric dispersion prior to drying such that an adhesive bond between the first substrate and the second substrate is provided by the film after drying.

15. A bonded pair of substrates prepared by the method according to claim 14.

16. A substrate prepared by the method according to claim 13.

17. The method according to claim 13, wherein the $SiO_2$ particles have an average particle diameter of 5 to 100 nm, and wherein the component comprises particles having an average particle diameter of 70 to 300 nm.

18. The method according to claim 17, further comprising disposing a second substrate on the aqueous polymeric dispersion prior to drying such that an adhesive bond between the first substrate and the second substrate is provided by the film after drying.

19. A bonded pair of substrates prepared by the method according to claim 18.

20. A substrate prepared by the method according to claim 17.

\* \* \* \* \*